United States Patent
Asfaw et al.

(10) Patent No.: US 10,897,672 B2
(45) Date of Patent: Jan. 19, 2021

(54) SPEAKER BEAM-STEERING BASED ON MICROPHONE ARRAY AND DEPTH CAMERA ASSEMBLY INPUT

(71) Applicant: Facebook, Inc., Menlo Park, CA (US)

(72) Inventors: Michael Asfaw, Foster City, CA (US); Michael Xingyi Yu, Mountain View, CA (US); Stefan Mag, San Mateo, CA (US); Michael Smedegaard, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/542,500

(22) Filed: Aug. 16, 2019

(65) Prior Publication Data

US 2020/0304916 A1 Sep. 24, 2020

Related U.S. Application Data

(60) Provisional application No. 62/820,187, filed on Mar. 18, 2019.

(51) Int. Cl.
*H04R 5/04* (2006.01)
*G06T 7/593* (2017.01)
*H04R 5/027* (2006.01)

(52) U.S. Cl.
CPC .............. *H04R 5/04* (2013.01); *G06T 7/593* (2017.01); *H04R 5/027* (2013.01); *H04R 2430/21* (2013.01)

(58) Field of Classification Search
None
See application file for complete search history.

(56) References Cited

U.S. PATENT DOCUMENTS

| | | | | |
|---|---|---|---|---|
| 8,045,722 B2* | 10/2011 | Choi | .................. | H04S 3/002 381/100 |
| 2009/0154723 A1* | 6/2009 | Choi | .................. | H04S 3/002 381/80 |
| 2011/0193933 A1 | 8/2011 | Ryu et al. | | |
| 2012/0056982 A1* | 3/2012 | Katz | .................. | G06F 3/017 348/43 |

(Continued)

FOREIGN PATENT DOCUMENTS

JP 2010-154110 A 7/2010

OTHER PUBLICATIONS

PCT International Search Report and Written Opinion, PCT Application No. PCT/US2020/018513, dated May 29, 2020, 18 pages.

*Primary Examiner* — Qin Zhu
(74) *Attorney, Agent, or Firm* — Fenwick & West LLP

(57) ABSTRACT

An audio device includes a speaker array and a controller for beam-steering audio output by the speaker array to localize sound in different locations in a local area around the audio device. The audio device also includes a microphone array or a set of cameras configured to detect an object, such as a human, in the local area around the audio device. From data captured by the microphone array or the set of cameras, the audio device determines a location of the object in the local area and steers the audio output by the speaker array towards the determined location of the object. As the object moves within the local area, the audio device dynamically steers the audio output to move along with the object.

23 Claims, 3 Drawing Sheets

(56) References Cited

U.S. PATENT DOCUMENTS

| | | | |
|---|---|---|---|
| 2013/0208900 A1* | 8/2013 | Vincent | H04S 7/303 |
| | | | 381/17 |
| 2014/0328505 A1* | 11/2014 | Heinemann | H04S 7/303 |
| | | | 381/303 |
| 2015/0296319 A1 | 10/2015 | Shenoy et al. | |
| 2015/0304789 A1 | 10/2015 | Babayoff et al. | |
| 2015/0382128 A1* | 12/2015 | Ridihalgh | H04S 7/301 |
| | | | 381/57 |
| 2016/0080880 A1* | 3/2016 | Goshen | H04R 29/005 |
| | | | 381/58 |
| 2016/0118036 A1 | 4/2016 | Cheatham, III et al. | |
| 2016/0148057 A1 | 5/2016 | Oh | |
| 2016/0381459 A1* | 12/2016 | Baca | H04N 13/254 |
| | | | 386/227 |
| 2018/0098172 A1* | 4/2018 | Family | H04R 1/403 |
| 2019/0261090 A1* | 8/2019 | Baca | H04N 13/207 |
| 2019/0379861 A1* | 12/2019 | Clark | H04N 13/204 |
| 2019/0387352 A1* | 12/2019 | Jot | H04S 7/305 |
| 2019/0394564 A1* | 12/2019 | Mehra | H04R 1/028 |
| 2020/0034980 A1* | 1/2020 | Peli | G06K 9/00912 |

\* cited by examiner

SPEAKER BEAM-STEERING BASED ON MICROPHONE ARRAY AND DEPTH CAMERA ASSEMBLY INPUT

CROSS-REFERENCE TO RELATED APPLICATIONS

This application claims the benefit of U.S. Provisional Application No. 62/820,187 filed Mar. 18, 2019, which is incorporated by reference in its entirety.

BACKGROUND

This disclosure relates generally to playing audio data, and more specifically to directing output of audio data to an object identified in a local area.

Conventional speakers are configured to output audio to a specific location or area. Hence, users are unable to hear audio output by a speaker when the user leaves the location where the speaker is configured to output audio. This limits an area in which a user may move before being unable to hear audio output by a speaker without repositioning the speaker or having to configure different speakers to provide audio output to different locations.

SUMMARY

An audio device includes plurality of speakers and a controller configured to direct audio output by the speakers to locations within a local area around the audio device. This allows the controller to localize audio output by the speakers to a specific location within the local area. To direct the audio output, the audio device includes a plurality of microphones and a depth camera assembly coupled to the controller. Using data captured by the plurality of microphones or the depth camera assembly, the controller identifies a location of an object, such as a human, within the local area surrounding the audio device.

From audio captured by the microphones or the depth camera assembly, the audio device determines a location of the object in the local area and steers the audio output by the speaker array towards the determined location of the object. In various embodiments, when the microphones capture audio data from a location within the local area, the controller determines a distance from the location to an axis perpendicular to a center of the audio device and perpendicular to a plane including the location. The controller also identifies an object at the determined location from video data captured by the depth camera assembly using one or more computer vision methods. Additionally, the controller determines a depth from the identified object to the depth camera assembly form depth information obtained by the depth camera assembly. From the determined distance and determined depth, the controller performs beam steering on audio output by the speakers to direct the audio output to the identified object, while attenuating the audio output directed to other locations in the local area. As the object moves within the local area, the audio device dynamically steers the audio output to move along with the object.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
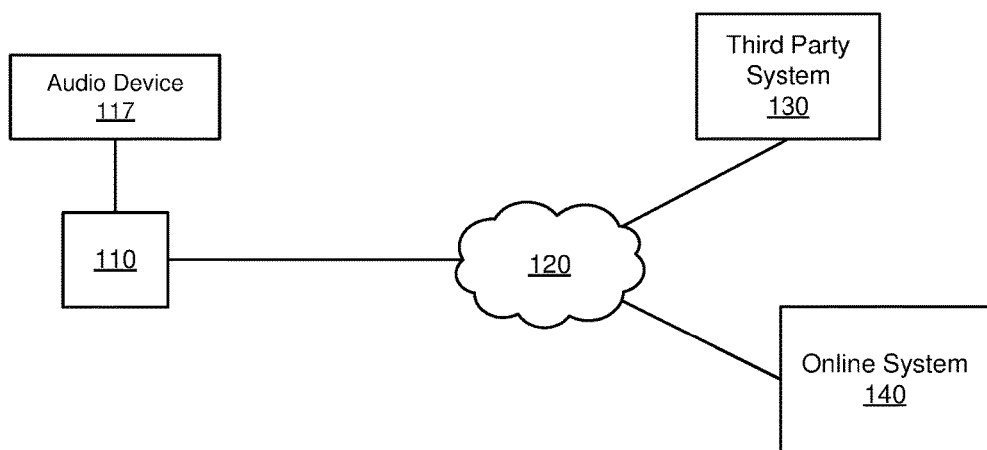
FIG. 1 is a block diagram of a system environment including an audio device operates, in accordance with an embodiment.

FIG. 1 is a block diagram of a system environment 100 including an audio device 117. The system environment 100 shown by FIG. 1 comprises a client device 110, a network 120, one or more third-party systems 130, and an online system 140. Additionally, in the system environment 100 shown by FIG. 1, the audio device 117 is coupled to the client device 110. In alternative configurations, different and/or additional components may be included in the system environment 100.

The client device 110 is computing device capable of receiving user input as well as transmitting and/or receiving data via the network 120. Additionally, the client device 110 is configured to present content, such as audio, video, or image data, to a user. In one embodiment, the client device 110 is a conventional computer system, such as a desktop or a laptop computer. Alternatively, a client device 110 may be a device having computer functionality, such as a personal digital assistant (PDA), a mobile telephone, a smartphone, or another suitable device. In other embodiments, the client device 110 is a television or monitor configured to obtain content and display the obtained content. In various embodiments, the client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

In various embodiments, the client device 110 includes a display device. The display device may be integrated into the client device or coupled to the client device. For example, a display device integrated into a client device is a display screen included in the client device. Alternatively, the display device is a monitor or other display coupled to the client device. The display device presents image data or video data to a user. Image or video data presented by the display device is determined by an application executing on the client device. Different applications may be included on the client device, so execution of different applications changes the content presented by the user by the display device. Additionally, content presented by the display device may be content received by the client device 110 from the online system 140 or from a third party system 130.

The audio device 117, further described below in conjunction with FIGS. 2-4, obtains audio data from the client device 110 and plays the audio data for one or more users in a local area surrounding the audio device 117. For example, the audio device 117 is a soundbar coupled to the client device 110. In other embodiments, the audio device 117 is coupled to the online system 140 or to the third party system 130 via the network 120 and plays audio data obtained from the online system 140 or from the third party system 130. As further described below in conjunction with FIGS. 2-4, the audio device 117 identifies an object in the local area surrounding the audio device and directs audio output to the identified object using one or more beam steering methods. This allows the audio device 117 to focus output of audio data toward the identified object. As further described below in conjunction with FIG. 4, as the identified object changes location within the local area, the audio device 117 dynamically updates the one or more beam steering methods applied to the audio data, so audio data output by the audio device 117 is directed towards the changed location of the identified object.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 3. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

The online system 140 exchanges content with the client device 110 via the network 120. In various embodiments, the online system 140 may also exchange content with the third party system 130 via the network. For example, the online system 140 is a social networking system, a content sharing network, or another system providing content to users. In various embodiments, the online system 140 maintains information about various users, connections between different users, and content for presentation to users.

Figure 2:
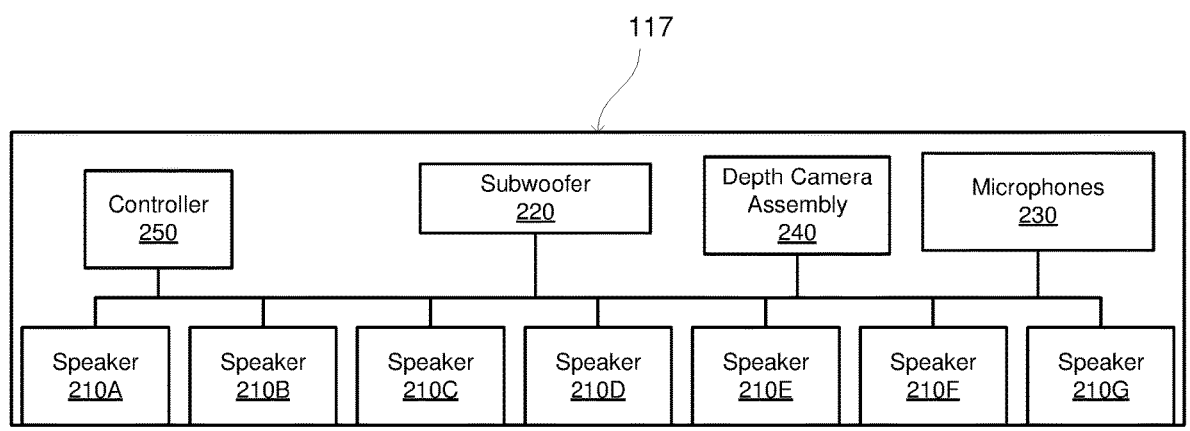
FIG. 2 is a block diagram of an audio device, in accordance with an embodiment.
Figure 3:
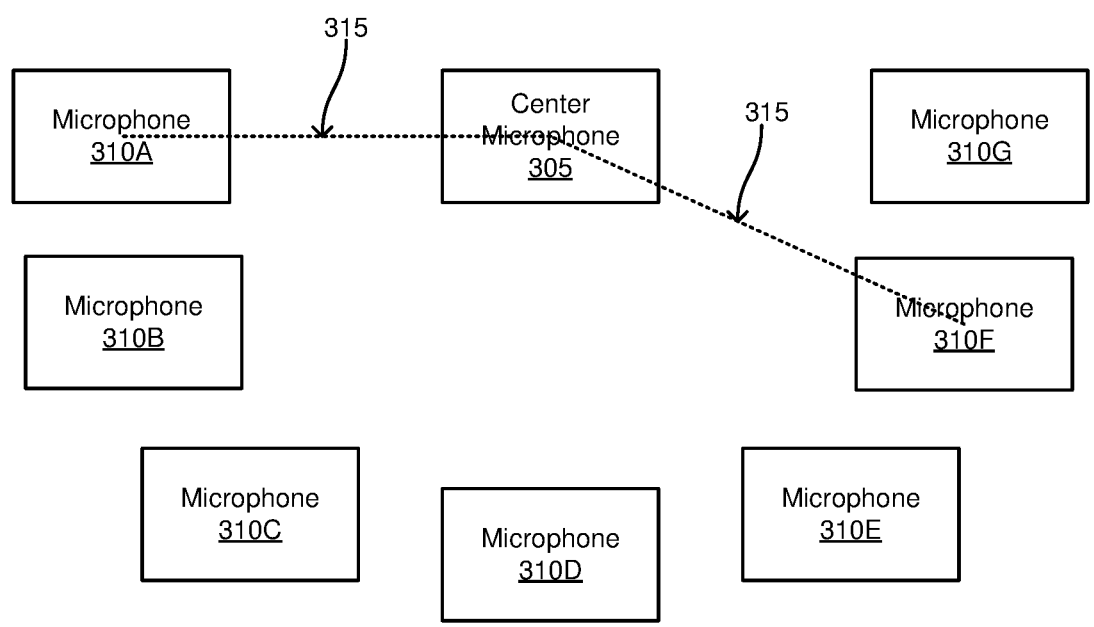
FIG. 3 is an example configuration of microphones on the audio device, in accordance with an embodiment.

FIG. 2 is a block diagram of an embodiment of an audio device 117. In the embodiment shown in FIG. 2, the audio device 117 includes multiple speakers 210A-G (also referred to individually and collectively using reference number 210), a subwoofer 220, a plurality of microphones 230, a depth camera assembly (DCA) 240, and a controller 250. However, in other embodiments, the client device 110 includes different or additional components than those shown in FIG. 2.

The speakers 210A-G each emit audio data, or sound, based on instructions received from the controller 250, which is coupled to each of the speakers 210A-G. The speakers 210A-G project the audio data into a local area surrounding the audio device 117. As further described below, instructions from the controller 250 to the speakers 210A-G perform beam steering that directs audio data output by the speakers 210A-G to a specific location within the local area surrounding the audio device 117. In various embodiments, instructions received from the controller 250 change the magnitude and phase of two or more speakers so combined audio data is added and is cancelled at the specific location within the local area. The speakers 210A-G are positioned next to each other in a common plane, with a speaker 210 separated from an adjacent speaker 210 by a common particular distance. For example, the particular distance specifies a distance between a center of a speaker 210 and a center of an adjacent speaker 210, so each pair of adjacent speakers have the particular distance between their centers. In various embodiments, each speaker 210 is enclosed to mitigate reactance from other speakers 210. While FIG. 2 shows an example where the audio device 117 includes seven speakers 210A-G, in other embodiments, the audio device 117 includes other numbers of speakers 210. For example, the audio device 117 includes between 5 and 9 speakers 210 in different embodiments.

The subwoofer 240 is a speaker configured to produce low-pitched audio frequencies, such as bass and sub-bass. For example, the subwoofer 240 outputs audio having frequencies less than 200 Hertz. In other embodiments, the subwoofer 240 outputs audio having frequencies less than 100 Hertz or less than 80 Hertz. The subwoofer 240 may be included in an enclosure in various embodiments, and may include an amplifier or be coupled to an amplifier in some embodiments.

The plurality of microphones 230 are configured to capture audio data, or sound, from the local area surrounding the audio device 117. Each microphone 230 converts captured audio data into an electronic format (e.g., analog data, digital data). In various embodiments, the plurality of microphones 230 comprise a first order differential microphone array. FIG. 3 shows an example configuration of the plurality of microphones 230. In the example shown by FIG. 3, eight microphones are positioned relative to each other to form a first order differential microphone array. As shown in FIG. 3, the plurality of microphones 230 include a center microphone 305 and other microphones 310A-G that are equally separated from the center microphone 305. In the example of FIG. 3, each of the other microphones 310A-G is separated from the center microphone 305 by a specific distance 315. to create the first order differential microphone array. While FIG. 3 shows an example including eight microphones, in other embodiments, the plurality of microphones 230 include any suitable number of microphones. In other embodiments, the plurality of microphones 230 are configured to create a second order differential microphone array. For example, the plurality of microphones 230 comprise at least six microphones arranged in a hexagonal pattern.

Referring back to FIG. 2, the DCA 240 captures video data of the local area surrounding the audio device 117 and determines depth information for the local area surrounding the audio device 117. The depth information identifies depths from the DCA 240 to locations in the local area surrounding the audio device 117. In various embodiments, the DCA 240 includes two cameras positioned next to each other and separated by a known baseline distance; the two cameras are positioned to capture stereoscopic images of the local area surrounding the audio capture device 117. A processor included in the DCA 240, or the controller 250, determines distances, or depths, between different locations in the local area and the DCA 240, also referred to as "depth information," from the captured stereoscopic images. Hence, the two or more cameras capture images of the local area surrounding the DCA 240 from different vantage points, allowing depth information to be determined by comparing relative positions of objects in the local area from images captured by the different cameras. The relative depth information can be obtained in the form of a disparity map which encodes the difference in horizontal coordinates of corresponding image points. The values in this disparity map are inversely proportional to the distance from the DCA 240 at a corresponding pixel location. In some embodiments, the DCA 240 also includes a structured light source or laser that determines correspondences between cameras and the structured light source or laser or correspondences between the cameras.

In some embodiments, the DCA 240 includes a structured light projector, a camera, and a processor. The structured light projector projects structured light of various patterns onto objects in the local area, producing an illumination on the objects that appears distorted from perspectives other than a perspective of the structured light projector. The camera captures images of structured light reflected from the objects, which from different perspectives, from which the processor reconstructs to reconstruct the three-dimensional (3D) shapes of the objects In some embodiments, the DCA 240 includes a camera and a depth sensor. The depth sensor determines distances between the DCA 240 and locations in the local area based on time of flight in various embodiments. For example, the depth sensor measures a time difference between light, or sound, emitted from the depth sensor towards a location in the local area and light, or sound, reflected from the location to determine the distance of the location in the local area from the DCA 240. If the depth sensor emits light, the emitted light may can include a light pulse such that the time of flight is measured directly; alternatively, the depth sensor may emit a continuous modulated sinusoidal light wave and indirectly determine time of flight by measuring the phase difference between the emitted light wave and the light wave reflected from the location in the local area. Hence, in various embodiments, the DCA 240 may determine the depth information according to a variety of principles such as time of flight, structured light depth sensing, stereo depth sensing, and active stereo depth sensing.

In other embodiments, the DCA 240 comprises a camera configured to capture video of the local area surrounding the audio device 117. The DCA 240 may include a processor coupled to the camera that applies one or more computer vision methods to frames in the captured video data to determine depth information to different locations within the local area. For example, the processor focuses the camera at different depths and captures frames of the local area with the different focal points and determines depth information to locations within the local area based on frames captured by the camera having different focal points. However, in other embodiments, the processor may determine depth information from frames captured by the camera using any suitable method or methods. Alternatively, the controller 250 is configured to determine depth information to locations within the local area from images captured by the camera in some embodiments.

The controller 250 is coupled to the speakers 210A-G, to the subwoofer 220, to the microphones 230, and to the depth camera assembly 240. The controller 250 comprises one or more processors and a non-transitory computer readable storage medium having instructions encoded thereon that, when executed by the one or more processors, cause the one or more processors to perform functionality further described below. From audio data captured by the microphones 230, the controller 250 determines a direction of a location in the local area from which the microphones 230 captured audio data relative to an axis perpendicular to a center of the audio device 117. For example, the controller 250 determines a distance between the location from which audio data was captured and the axis perpendicular to the center of the audio device 117 and perpendicular to a plane including the location from which audio data was captured. Referring to FIG. 4, an example where the microphones 230 of the audio device 117 captured audio data from location 405 is shown. From the captured audio data, the controller 250 uses one or more methods to determine a distance 420 between the location 410 from which the microphones 230 captured the audio data and the axis 415, which is perpendicular to a center of the audio device 117 and is also perpendicular to a plane including the location 410 from which the microphones 230 captured the audio data.

Referring back to FIG. 2, from video data captured by the DCA 240 and depth information determined by the DCA 240, the controller 250 also determines a distance from the DCA 240 to the location from which the microphones 230 captured the audio data. For example, the controller 240 identifies an object at the location from which the microphones 230 captured the audio data from video data of the local area captured by the DCA 240 and determines a depth of the identified object from the DCA 240 from depth information determined by the DCA 240. Referring back to FIG. 4, from video data 240 captured by the DCA 240, the controller 250 identifies an object in, or located at, the location 410 from which the microphones 230 captured audio data. From depth information determined by the DCA 240, the controller 250 determines a depth 425 of the object at the location 410 from the DCA 240, specifying a distance between the object at the location 410 and the DCA 240.

In various embodiments, to identify objects, such as people, from video data captured by the DCA 240, the controller 250 generates a model identifying one or more foreground portions of frames of the captured video data and a background portion of frames of the video data. In various embodiments, the model identifies the background portion of frames of the video data with the model, so regions of the video data that are not identified as the background portion are the one or more foreground portions of the video data. The controller 250 may generate the model based on changes in different regions of the captured video data over time, so regions of the video data having less than a threshold amount of change over at least a threshold number of consecutive pixels are identified as background portions of the captured video data. For example, the generated model identifies the background portion of the captured video data as areas of the captured video data including static objects, while a foreground portion includes a region of the captured video data including moving objects, such as people, or otherwise including pixels having attributes that change at least a threshold amount between consecutive frames of the captured video data. The generated model differentiates between background objects (e.g., furniture, walls, bookshelves, tables, chairs, carpeting, ceilings, chandeliers, and any other object that remains in the environment without moving) in the local area for which the DCA 240 captures video data and objects, such as people, within the local area that move over time. In various embodiments, the controller 250 generates the model using periodic color and pixel information for consecutive frames in the captured video data to determine portions of the captured video data of the local area that are background and portions of the captured video data of the local area are foreground. If pixels of the captured video data some of the pixels periodically move (e.g., change color or intensity) between consecutive frames of the captured video data, the controller 250 identifies those pixels as a foreground portion of the captured video data. However, if pixels remain unchanged for a threshold period of time or for a threshold number of consecutive frames of the captured video data, the pixels are identified as a background portion of the captured video data.

Hence, the controller 250 generates a model that differentiates a foreground portion of captured video data from a background portion of the video data based on differences in pixels having corresponding locations in consecutive frames of video data. In some embodiments, the generated model labels regions of the captured video data corresponding to pixels in different locations within a frame of the captured video data as a background portion or as a foreground portion. Alternatively, the generated model labels regions of the captured video data corresponding to pixels in different locations within a frame of the captured video data as a background portion, and does not label regions of the captured video data corresponding to foreground portions (or vice versa).

In some embodiments, the controller 250 records color values for pixels associated with background portions of the captured video data and labels the recorded color values for the pixels associated with a background portion as background. The controller 250 may also obtain depth information in various embodiments, so each pixel has a depth value as well as corresponding color values. When generating the model identifying the background portion of the captured video data, the controller 250 may use depth values for different pixels, as pixels with smaller depth values are more likely to be a foreground portion, while pixels with larger depth values are more likely to be a background portion.

In addition to generating the model identifying the background portion of the captured video data, the controller 250 applies one or more additional models to the captured video data to identify one or more regions within frames of video data that include people (or other objects). Application of the one or more additional models allows the controller 250 to identify regions within frames of the captured video data that include people, or other objects, even though the people remain stationary or minimally moving for a time interval. For example, the one or more additional models perform two- or three-dimensional pose tracking, allowing the controller 250 to combine identification of a background portion of captured video data and identification of regions of the captured video data including a person, or other object, based on the pose tracking. In various embodiments, the controller 250 identifies portions of the local area captured by the video data as background portions except for regions within the video data the one or more additional models identify as including a person (or another object) via two- or three-dimensional pose tracking.

In various embodiments, the controller 250 identifies regions within frames of the captured video data that include people by generating a bounding box (e.g., bounding box) that surrounds two- or three-dimensional pose data for each person (or other object). A bounding box may be generated for each person (or other object) identified via two- or three-dimensional pose data. From the model identifying background portions and foreground portions of the captured video data, the controller 250 may differentiate between animate objects (e.g., people, animals) and inanimate objects (e.g., photographs, coat racks, wall art) based on an amount of movement made by each object makes. If the controller 250 determines an object moves more than a threshold amount in consecutive frames of the captured video data, the object is classified as animate, while an object moving less than the threshold amount in consecutive frames of the captured video data is classified as inanimate. In some embodiments, the controller 250 classifies an object determined to be animate as a person when two- or three-dimensional pose data of the object has at least a threshold similarity with two- or three-dimensional pose data of a person.

For example, the controller 250 performs facial tracking (in two-dimensions or in three-dimensions), two-dimensional pose tracking, three-dimensional pose tracking, or any other suitable method to identify portions of a person's face or portions of the person's body. The controller 250 identifies regions of the captured video data including people (or other objects) and stores metadata in association with the video data specifying locations within the captured video data of the identified regions. For example, the controller 250 stores coordinates of frames of the video data specifying a bounding box identified as including a person (or another object), so the bounding box specifies the region of the captured video data including the person (or the other object).

In some embodiments, the controller 250 subsequently gathers and updates data for background portions of the captured video data other than regions of the captured video data identified as including people (or other objects). Hence, the controller 250 may update information about background portions of the captured video data over time, while using previously captured data or non-uniform values (i.e., static) for pixels of backgrounds of regions of the captured video data identified as including a person (or another object). For RGB images, non-uniform pixels comprise non-uniform red, green, blue values; for example, adjacent pixels have RGB values of either (0, 50, 150), (0, 50, 150) or (50, 50, 50), (100, 100, 100). In other embodiments, the color space may be grayscale, HSV, or any other suitable color space. Each pixel of the captured video data corresponds to a particular location within the local area of which video data was captured 405 and each pixel of the captured video data has a position in a coordinate system that is different from positions of other pixels. For example, a pixel in a bottom-left corner of a frame of the captured video data has a coordinate pair of (0,0), representing a horizontal and a vertical position within the frame. Each pixel may also have a particular color value, such as a RGB color value.

From the distance between the location from which the microphones 230 captured the audio data and the axis perpendicular to both the center of the audio device 117 and the plane including the location from which the microphones 230 captured the audio data and the distance from the location from which the microphones 230 captured the audio data and the DCA 240, the controller 250 directs audio output by each of the speakers 210A-G to the location from which the microphones 230 captured the audio data. In one embodiment, to direct the audio output by each of the speakers 210A-G, the controller 250 models a summed audio signal from the speakers 210A-G as:

$$S(l, h) = \sum_{n=1}^{7} \frac{1}{r_n} \omega_n G_n \sin(\omega_n[t + \delta_n]) \quad (1)$$

Where n is an index denoting different speakers 210A-G, $\omega_n$ is a weighting function, and $G_n$ is a gain. The sinusoidal audio signal with a delay compensation for each speaker 210A-G has a maximum at the location from which the microphones 230 captured audio data because of a distance from each speaker 210A-G to the location from which the microphones 230 captured audio data.

For each speaker 210A-G, the controller 250 determines the distance from a speaker 210A-G to the location from which the microphones 230 captured audio data using:

$$r_n = \sqrt{l^2 + (h-(4-n)d)^2} \quad (2)$$

Where n is an index denoting different speakers 210A-G, l is the distance from the DCA 240 to the location where the microphones 230 captured audio data, h is the distance between the location from which the microphones 230 captured the audio data and the axis perpendicular to both the center of the audio device 117 and the plane including the location from which the microphones 230 captured the audio data, and d is the particular distance between adjacent speakers 210A-G.

In an embodiment where the gain, $G_n$, from equation (1) above is 1, the delay of a speaker 210A-G, $\delta_n$ in equation (1) above is defined as:

$$\delta_n = \frac{(n-4)d\sin\theta_n}{c} \quad (3)$$

Where n is an index denoting different speakers 210A-G, d is the particular distance between adjacent speakers 210A-G, c is the speed of sound (344 m/s), and $\theta_n$ is an angle between the location where the microphones 230 captured audio data and an axis perpendicular to a center of a speaker 210A-G and perpendicular to a plane including the location where the microphones 230 captured audio data.

The delay, $\delta_n$, of a speaker 210A-G is determined by the controller 250 from the distance from the DCA 240 to the location where the microphones 230 captured audio data and the distance between the location from which the microphones 230 captured the audio data and the axis perpendicular to both the center of the audio device 117 and the plane including the location from which the microphones 230 captured the audio data as:

$$\tan\theta = \frac{h}{l} \quad (4)$$

Where l is the distance from the DCA 240 to the location where the microphones 230 captured audio data, h is the distance between the location from which the microphones 230 captured the audio data and the axis perpendicular to both the center of the audio device 117 and the plane including the location from which the microphones 230 captured the audio data.

Thus, the controller 250 determines the following for the angle between the location where the microphones 230 captured audio data and an axis perpendicular to a center of a speaker 210A-G and perpendicular to a plane including the location where the microphones 230 captured audio data from the distance from the DCA 240 to the location where the microphones 230 captured audio data and the distance between the location from which the microphones 230 captured the audio data and the axis perpendicular to both the center of the audio device 117 and the plane including the location from which the microphones 230 captured the audio data:

$$\tan\theta_n = \frac{h-(4-n)d}{l} \quad (5)$$

$$\sin\theta_n = \frac{h}{\sqrt{l^2 + (h-(4-n)d)^2}} \quad (6)$$

$$\cos\theta_n = \frac{l}{\sqrt{l^2 + (h-(4-n)d)^2}} \quad (7)$$

Where n is an index denoting different speakers 210A-G, l is the distance from the DCA 240 to the location where the microphones 230 captured audio data, h is the distance between the location from which the microphones 230 captured the audio data and the axis perpendicular to both the center of the audio device 117 and the plane including the location from which the microphones 230 captured the audio data.

Figure 4:
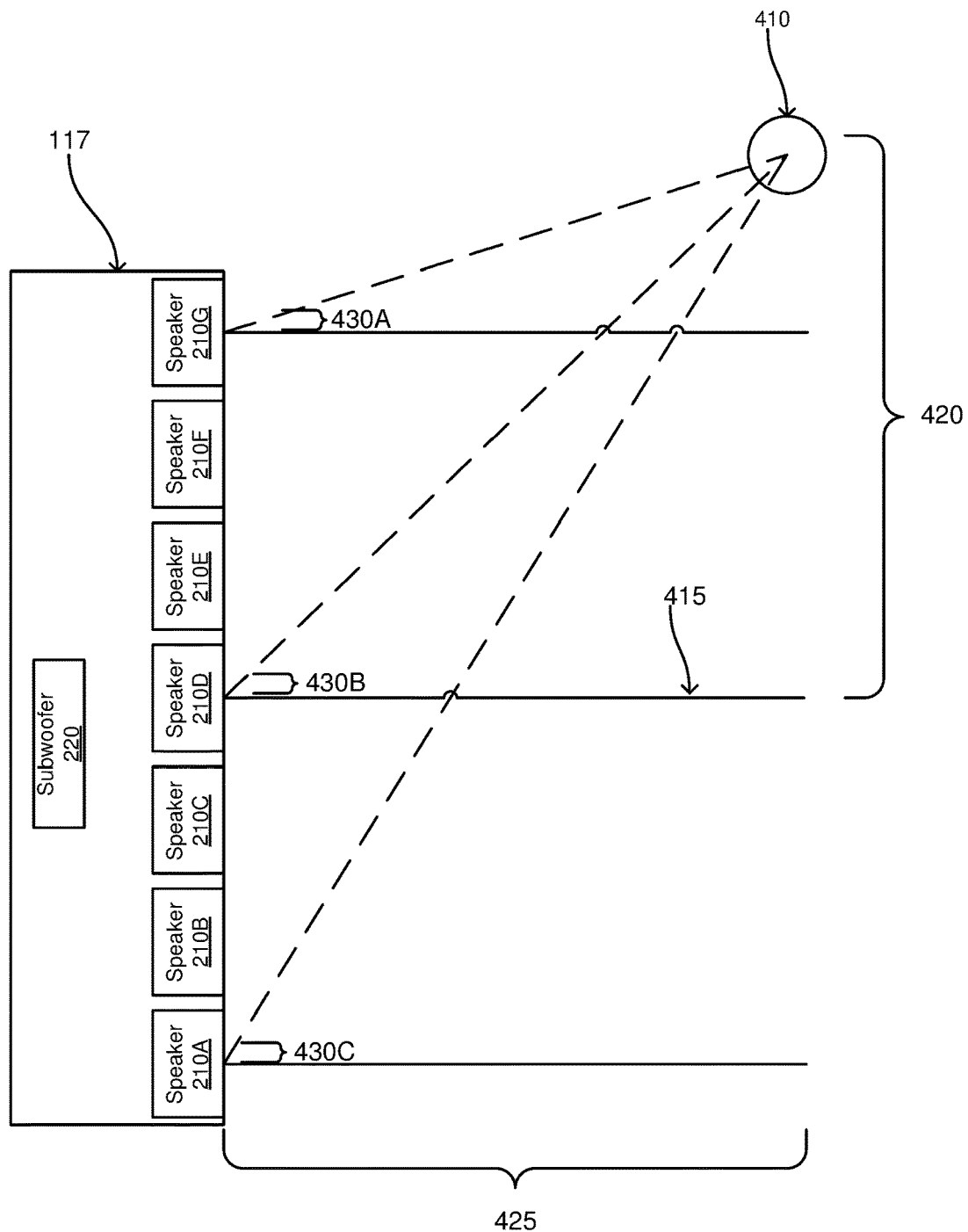
FIG. 4 is a block diagram of an audio device determining a location of an object in a local area surrounding the audio device, in accordance with an embodiment.

Referring to the example of FIG. 4, the controller 250 applies equations 5-7 above to the depth 425 of the object at the location 410 from the DCA 240, specifying a distance between the object at the location 410 and the DCA 240 and to the distance 420 between the location 410 from which the microphones 230 captured the audio data and axis 415, which is perpendicular to a center of the audio device 117 and is also perpendicular to a plane including the location 410 from which the microphones 230 captured the audio data to determine sine, cosine, and tangent values for angle 430A, angle 430B, and angle 430C. In the example of FIG. 4, angle 430A corresponds to $\theta_1$, angle 430B corresponds to $\theta_4$, and angle 430C corresponds to $\theta_7$. While FIG. 4 shows angle 430A, angle 430B, and angle 430C for purposes of illustration, the controller 250 determines corresponding values for each of the speakers 210A-G.

Referring back to FIG. 2, in various embodiments, the controller 250 applies a pressure gradient to audio output by each speaker 210A-G using a cosine function, in various embodiments, the controller 250 uses a Chebyshev polynomial, $W^a_n$, or a Legendre polynomial, $W^b_n$, to apply the pressure gradient:

$$W^a_n = 2\left(\cos\frac{\theta_n}{\theta_0}\right) - 1 \quad (8)$$

$$W^b_n = \frac{3}{2}\left(\cos\frac{\theta_n}{\theta_0}\right)^2 - \frac{1}{2} \quad (9)$$

Where $\theta_0$ is a scaling angle that determines maximum coverage. In some embodiments, the controller 250 determines the scaling angle by applying one or more machine learning models and computer vision based on a distance of the location from which the microphones 230 captured audio data from the audio device 117.

In various embodiments, the controller 250 uses a weighting for the summed signal, S(l,h) in equation 1, that creates a local maximum. For example, the controller 250 uses a two dimensional (2D) exponential function:

$$u(x,y) = e^{-(x^2+y^2)} \quad (10)$$

The exponential function in equation 10 has a Taylor series expansion of:

$$u(x, y) = \left(1 - x^2 + \frac{x^4}{4}\right) * \left(1 - y^2 + \frac{y^4}{4}\right) \quad (11)$$

The summed signal can be expressed as:

$$S(l, h) = N_{nw} \sum_{n=1}^{7} W_n \quad (12)$$

Where $N_{nw}$ is the signal portion without being weighted, and n is an index identifying each speaker 210A-G.

In various embodiments, the controller 250 limits the angle of the weighting to −90 degrees to 90 degrees, corresponding to the horizontal plane from the audio device 117, resulting in a universal angle, θ, so x=y=sin(θ), so a weighting function, Wn, for a speaker 210A-G is $$W_n = \left(1 - \sin^2\frac{\theta_n}{\theta_0} + \frac{\sin^4\frac{\theta_n}{\theta_0}}{2}\right)^2 \quad (13)$$

Hence, the controller 250 modifies audio output by each speaker 210A-G so audio output by each speaker 210A-G has a maximum at the location where the microphones 230 captured audio data and at the depth from the DCA 240 at the location where the microphones 230 captured audio data, and is minimized at other locations. This directs the audio output by the speakers 210A-G to the object identified at the location where the microphones 230 captured audio data.

In other embodiments, the controller 250 uses a shading function that is probability density function to prevent side lobes of the audio data output by the speakers 210A-G outside of the object at the location where the microphones 230 captured audio data. For example, the probability density function is:

$$f(x|N, p) = \binom{N}{x} p^x (1-p)^{N-x} \quad (14)$$

Where x=0, 1, 2, . . . , N+1, and N is the number of speakers 210A-G. In some embodiments, the controller 250 specifies a value for ½ for the probability, p. To account for beam steering of audio output by the speakers 210A-G, the controller multiplies the probability by the cosine of the angle between the location where the microphones 230 captured audio data and an axis perpendicular to a center of a speaker centrally located in the audio device 117 and perpendicular to a plane including the location where the microphones 230 captured audio data. In the example of FIG. 5, the speaker 210D is centrally located in the audio device 117, and is the fourth speaker 210A-D. Hence, the controller 250 multiplies the probability by cosine of angle 430B, which corresponds to multiplying the probability by the cosine of $\theta_4$ in the preceding equations. Applying the shading function to the audio output by different speakers 210A-G allows the controller 250 to remove side lobes from the audio data output by different speakers 210A-G.

Thus, when compensating for delays, the summed signal determined by the controller 205 is:

$$S(l, h) = \sum_{n=1}^{7} \frac{1}{r_n} \omega_n G_n P_{ac}(j\omega) * e^{j\omega \delta_n} \quad (15)$$

Where $P_{ac}(j\omega)$ is the transfer function in the frequency domain, and the summed signal compensates for delays using equation (15).

The controller 250 determines changes in the depth of the identified object relative to the DCA 240 or changes in the distance between the location of the identified object from which the microphones 230 captured the audio data and the axis perpendicular to both the center of the audio device 117 and the plane including the location from which the microphones 230 captured the audio data from data captured by the DCA 240 or by the microphones 230. For example, in response to depth information from the DCA 240 indicating a change in the depth of the identified object from the DCA, the controller 250 redirects audio output by the speakers 210A-G to the changed depth of the object at the distance between the location of the identified object from which the microphones 230 captured the audio data and the axis perpendicular to both the center of the audio device 117 and the plane including the location from which the microphones 230 captured the audio data. In another example, data from the microphones 230 or from the DCA 240 indicates the distance between the location of the identified object and the axis perpendicular to both the center of the audio device 117 and the plane including the location from which the microphones 230 captured the audio data changes, so the controller 250 redirects audio output by the speakers 210A-G to the changed distance between the location of the identified object and the axis perpendicular to both the center of the audio device 117 and the plane including the location from which the microphones 230 captured the audio data and to the depth of the identified object from the DCA 240. Additionally, in response to determining the distance between the location of the identified object and the axis perpendicular to both the center of the audio device 117 and the plane including the location from which the microphones 230 captured the audio data changes and the depth of the identified object from the DCA 240 changes, the controller 250 redirects audio output by the speakers to the changed distance from the axis perpendicular to both the center of the audio device 117 and the plane including the identified object and to the changed depth of the identified object from the DCA 240. Hence, as the identified object changes location within the local area, the controller 250 dynamically redirects audio output by the speakers 210A-G so the output audio follows the identified object throughout the local area.

In some embodiments, the controller 250 maintains privacy settings for one or more users of the audio device 117. Privacy settings may allow a first user to specify (e.g., by opting out, by not opting in) whether the audio device 117 may receive, collect, log, or store particular objects or information associated with the user for any purpose. In particular embodiments, privacy settings may allow the first user to specify whether particular video capture devices, audio capture devices, applications or processes may access, store, or use particular objects or information associated with the user. The privacy settings may allow the first user to opt in or opt out of having objects or information accessed, stored, or used by specific devices, applications or processes. The audio device 117 may access such information in order to provide a particular function or service to the first user, without the audio device 117 having access to that information for any other purposes. Before accessing, storing, or using such objects or information, the online system may prompt the user to provide privacy settings specifying which applications or processes, if any, may access, store, or use the object or information prior to allowing any such action.

The privacy settings maintained and enforced by the controller 250 may be associated with default settings. In various embodiments, the controller 250 does not identify a user within captured video data, audio data, image data, or other data unless the controller 250 obtains a privacy setting from the user authorizing the controller 250 to identify the user. For example, a privacy setting associated with a user has a default setting preventing the controller 250 from identifying the user, so the controller 250 does not identify the user unless the user manually alters the privacy setting to allow the controller 250 to identify the user. Additionally, an alternative privacy setting regulates transmission of information from the audio device 117 identifying the user to another entity (e.g., the media device 110, the online system 140, a third party system 130) in various embodiments. The alternative privacy setting has a default setting preventing transmission of information identifying the user in various embodiments, preventing the controller 250 from transmitting information identifying the user to other entities unless the user manually modifies the alternative privacy setting to authorize transmission). The controller 250 maintains the one or more privacy settings for each user identified from captured video data or other data, allowing user-specific control of transmission and identification of each user. In some embodiments, the controller 250 prompts a person to provide privacy settings when the controller 250 initially identifies the person from captured data and stores the provided privacy settings in association with information identifying the person.

Users may authorize the capture of data, identification of users, and/or sharing and cross-application use of user-related data in one or more ways. For example, user may pre-select various privacy settings before the users use the features of the client devices 110 and/or take actions in the online system 140. In another case, a selection dialogue may be prompted when users first carry out an action or use a feature of the client devices 110 and/or the online system 140 and/or when users have not carried out the action or used the feature for a predetermined period of time. In yet another example, the client devices 110 and the online system 140 may also provide notifications to the users when certain features that require user data begin to operate or are disabled due to users' selections to allow users to make further selections through the notifications. Other suitable ways for users to make authorizations are also possible.

In some embodiments, the controller 250 obtains information maintained by the online system 140 or from one or more third party systems 130 for a user identified from captured video data, subject to privacy settings for the user. Based on video data, audio data, image data, or other data including the user previously captured by the client device 110 and the obtained information, the controller 250 may generate content for presentation to the user via the client device 110. For example, the controller 250 overlays content items from the online system 140 associated with one or more objects identified by the controller 250 from video data or image data captured by the client device 110. Alternatively, the online system 140 generates content for the user based on video data, image data, audio data, or other data including the user received from the client device 110 and information maintained by the online system 140 for the user (or obtained from one or more third party systems 130 by the online system 140) and provides the generated content to the client device 110 for presentation to the user.

In some embodiments, the controller 250 is configured to identify an object within the local area of the audio device 117 from data captured by one or more sensors that include the microphones 230 and the depth camera assembly 240. From the data captured by one or more of the sensors, the controller 250 identifies an object within the local area of the audio device 117 and determines a distance from the audio device 117 to the identified object. The controller 250 directs audio output by the speakers 210A-G to the distance in the local area corresponding to the identified object, as further described above. Hence, in various embodiments, the controller 250 uses data captured by the microphones 230 or by the depth camera assembly 240 to identify an object within the local area surrounding the audio device 117 and a distance from the audio device 117 to the identified object. For example, the controller 250 estimates a depth from the audio device 117 and a location relative to a center of the audio device 117 from video data captured by a camera included in the depth camera assembly 240. In another example, the controller 250 determines a direction of arrival of audio date captured by the microphones 240 using one or more methods and directs audio output by the speakers 210A-G in the determined direction of arrival. As another example, the controller 250 determines a depth from the audio device 117 to the identified object from depth information determined by the depth camera assembly 240 and directs audio output by the speakers 210A-G to the depth of the identified object. Thus, in various embodiments, the controller 250 determines a distance and a direction to which audio output by the speakers 210A-G is directed using different sensors, or combinations of sensors, included in the audio device 117 (such as the microphones 230 and the depth camera assembly 240 further described above).

ADDITIONAL CONFIGURATION CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A device comprising:
   a plurality of speakers;
   a plurality of microphones configured to capture audio data from a local area surrounding the plurality of microphones;
   a depth camera assembly configured to capture video data of the local area and to determine depth information identifying depths from the depth camera assembly to locations within the local area;
   a controller coupled to the plurality of microphones, to the depth camera assembly, and to the plurality of speakers, the controller configured to:
      determine, from the audio data captured by the plurality of microphones, a distance relative to an axis perpendicular to a center of the device of a location in the local area from which the plurality of microphones captured audio data;
      identifying an object within the location in the local area from which the plurality of microphones captured audio data and from video data captured by the depth camera assembly;
      determine a depth from the depth camera assembly to the identified object from depth information captured by the depth camera assembly; and
      direct audio output by each of the speakers to the identified object at the distance relative to the axis perpendicular to the center of the device of the location in the local area from which the plurality of microphones captured audio data and at the depth from the depth camera assembly by:
         determining a shading function based on a product of a probability determined by the controller and an angle from an axis normal to a center of a speaker located in a center of the plurality of speakers to the location in the local area from which the plurality of microphones captured audio data; and
         applying the shading function to the audio output by the plurality of speakers.

2. The device of claim 1, wherein the depth camera assembly comprises a pair of cameras separated by a specific distance and positioned side by side.

3. The device of claim 1, wherein the depth camera assembly comprises a camera and a depth sensor.

4. The device of claim 1, wherein the depth camera assembly comprises a camera, and the controller is configured to determine depth from the depth camera assembly to the identified object from video data captured by the camera.

5. The device of claim 1, wherein the plurality of microphones comprises a first order differential microphone array.

6. The device of claim 5, wherein the first order differential microphone array comprises a center microphone and other microphones having equal distances from the center microphone.

7. The device of claim 1, wherein the plurality of microphones comprises a second order differential microphone array.

8. The device of claim 7, wherein the second order differential microphone array comprises at least six microphones arranged in a hexagonal pattern.

9. The device of claim 1, wherein the controller is further configured to:
   determine a change in location of the identified object within the local area from data captured by the depth camera assembly;
   determine an updated distance relative to the axis perpendicular to the center of the device and the changed location of the identified object;
   determine an updated depth from the depth camera assembly to the identified object in the changed location; and
   redirect audio output by each of the speakers to the identified object at the changed location within the local area from the updated distance and the updated depth.

10. The device of claim 1, wherein the controller is further configured to:
    determine a change in location of the identified object within the local area from data captured by the depth camera assembly;
    determine an updated distance relative to the axis perpendicular to the center of the device and the changed location of the identified object;
    redirect audio output by each of the speakers to the identified object at the changed location within the local area from the updated distance and at the depth.

11. The device of claim 1, wherein the controller is further configured to:
    determine an updated depth from the depth camera assembly to the identified object; and redirect audio output by each of the speakers to the identified object at the distance relative to the axis perpendicular to the center of the device of the location in the local area from which the plurality of microphones captured audio data and at the updated depth.

12. The device of claim 1, further comprising a subwoofer coupled to the controller.

13. A computer program product comprising a non-transitory computer readable storage medium having instructions encoded thereon that, when executed by a processor, cause the processor to:
identify an object within a local area of a device from data captured by one or more sensors included in the device, the captured data including audio data and video data;
determine a depth from the device to the identified object from video data captured by a sensor included in the device;
determine a distance relative to an axis perpendicular to a center of the device of a location in the local area from which one or more microphones included in the device captured the audio data;
and direct audio output by each of a plurality of speakers of the device to the identified object at the determined depth and at the distance relative to an axis perpendicular to a center of the device of a location in the local area from which one or more microphones included in the device captured the audio data by
determining a shading function based on a product of a probability determined by the processor and an angle from an axis normal to a center of a speaker located in a center of the plurality of speakers to the determined depth and a determined location of arrival or the audio data captured by the one or more microphones; and
applying the shading function to the audio output by the plurality of speakers.

14. The non-transitory computer readable storage medium of claim 13, wherein the sensor comprises a camera.

15. The non-transitory computer readable storage medium of claim 13, wherein the sensor comprises a depth camera assembly.

16. A computer program product comprising a non-transitory computer readable storage medium having instructions encoded thereon that, when executed by a processor, cause the processor to:
determine, from audio data captured by a plurality of microphones included in a device, a distance relative to an axis perpendicular to a center of the device of a location in a local area from which the plurality of microphones included in the device captured the audio data;
obtain video data of the local area from a depth camera assembly and depth information identifying depths from the depth camera assembly to locations within the local area from the depth camera assembly identify an object within the location in the local area from which the plurality of microphones captured audio data from data captured by the depth camera assembly;
determine a depth from the depth camera assembly to the identified object from data captured by the depth camera assembly; and
direct audio output by each of a plurality of speakers of the device to the identified object at the distance relative to the axis perpendicular to the center of the device of the location in the local area from which the plurality of microphones captured audio data and to the depth from the depth camera assembly to the identified object by
determining a shading function based on a product of a probability determined by the processor and an angle from an axis normal to a center of a speaker located in a center of the plurality of speakers to the location in the local area from which the plurality of microphones captured audio data; and
applying the shading function to the audio output by the plurality of speakers.

17. The computer program product of claim 16, wherein the non-transitory computer readable storage medium further has instructions encoded thereon that, when executed by the processor, cause the processor to:
determine a change in location of the identified object within the local area from data captured by the depth camera assembly;
determine an updated distance relative to the axis perpendicular to the center of the device and the changed location of the identified object;
determine an updated depth from the depth camera assembly to the identified object in the changed location; and
redirect audio output by each of the plurality of speakers to the identified object at the changed location within the local area from the updated distance and the updated depth.

18. The computer program product of claim 16, wherein the non-transitory computer readable storage medium further has instructions encoded thereon that, when executed by the processor, cause the processor to:
determine a change in location of the identified object within the local area from data captured by the depth camera assembly;
determine an updated distance relative to the axis perpendicular to the center of the device and the changed location of the identified object;
redirect audio output by each of the plurality of speakers to the identified object at the changed location within the local area from the updated distance and at the depth.

19. The computer program product of claim 16, wherein the non-transitory computer readable storage medium further has instructions encoded thereon that, when executed by the processor, cause the processor to:
determine an updated depth from the depth camera assembly to the identified object; and
redirect audio output by each of the plurality of speakers to the identified object at the distance relative to the axis perpendicular to the center of the device of the location in the local area from which the plurality of microphones captured audio data and at the updated depth.

20. A computer program product comprising a non-transitory computer readable storage medium having instructions encoded thereon that, when executed by a processor, cause the processor to:
determine, from audio data captured by a plurality of microphones included in a device, a distance relative to an axis perpendicular to a center of the device of a location in a local area from which the plurality of microphones included in the device captured the audio data;
obtain video data of the local area from a depth camera assembly and depth information identifying depths from the depth camera assembly to locations within the local area from the depth camera assembly identify an object within the location in the local area from which the plurality of microphones captured audio data from data captured by the depth camera assembly;

determine a depth from the depth camera assembly to the identified object from data captured by the depth camera assembly; and direct audio output by each of a plurality of speakers of the device to the identified object at the distance relative to the axis perpendicular to the center of the device of the location in the local area from which the plurality of microphones captured audio data and to the depth from the depth camera assembly to the identified object by for each of the plurality of speakers, determine an angle from an axis perpendicular to a center of a speaker to the location in the local area from which the plurality of microphones captured audio data;

determine a weighting function for each of the plurality of speakers, the weighting function for a speaker based on the angle determined for the speaker and having a maximum at the determined distance and at the determined depth; and for each of the plurality of speakers, apply the weighting function corresponding the speaker to audio output by the speaker.

21. The computer program product of claim 20, wherein the non-transitory computer readable storage medium further has instructions encoded thereon that, when executed by the processor, cause the processor to:

determine a change in location of the identified object within the local area from data captured by the depth camera assembly;

determine an updated distance relative to the axis perpendicular to the center of the device and the changed location of the identified object;

determine an updated depth from the depth camera assembly to the identified object in the changed location; and redirect audio output by each of the plurality of speakers to the identified object at the changed location within the local area from the updated distance and the updated depth.

22. The computer program product of claim 20, wherein the non-transitory computer readable storage medium further has instructions encoded thereon that, when executed by the processor, cause the processor to:

determine a change in location of the identified object within the local area from data captured by the depth camera assembly;

determine an updated distance relative to the axis perpendicular to the center of the device and the changed location of the identified object;

redirect audio output by each of the plurality of speakers to the identified object at the changed location within the local area from the updated distance and at the depth.

23. The computer program product of claim 20, wherein the non-transitory computer readable storage medium further has instructions encoded thereon that, when executed by the processor, cause the processor to:

determine an updated depth from the depth camera assembly to the identified object; and redirect audio output by each of the plurality of speakers to the identified object at the distance relative to the axis perpendicular to the center of the device of the location in the local area from which the plurality of microphones captured audio data and at the updated depth.

* * * * *

UNITED STATES PATENT AND TRADEMARK OFFICE
CERTIFICATE OF CORRECTION

PATENT NO. : 10,897,672 B2
APPLICATION NO. : 16/542500
DATED : January 19, 2021
INVENTOR(S) : Asfaw et al.

Page 1 of 1

It is certified that error appears in the above-identified patent and that said Letters Patent is hereby corrected as shown below:

On the Title Page

Item (58), in Column 1, under "Field of Classification Search", Line 1, delete "None"
and insert -- CPC.............. H04R 5/04; H04R 5/027;
　　　　　　　　　　　H04R 2430/21; G06T 7/593
　　　USPC............ 381/26; 1; 2; 10; 12; 16-23; 56; 58; 59; 61; 92; 95; 96; 104; 107; 108;
　　　　　　　　　　20; 122; 123; 124; 300; 303; 306; 307 --, therefor.

In the Claims

In Column 17, in Claim 13, Line 22, after "data;" insert -- and --.

In Column 17, in Claim 13, Line 23, delete "and" before "direct".

In Column 17, in Claim 16, Line 57, delete "assembly identify an" and insert -- assembly; --, therefor.

In Column 17, in Claim 16, Line 58, delete "object" and insert -- identify an object --, therefor.

In Column 18, in Claim 20, Line 67, after "assembly" insert -- ; --.

Signed and Sealed this
　　　　　　　　　　　　　　　　　Tenth Day of August, 2021

Drew Hirshfeld
　　　　　　　　　　　　　　　　*Performing the Functions and Duties of the*
　　　　　　　　　　　　*Under Secretary of Commerce for Intellectual Property and*
　　　　　　　　　　　　*Director of the United States Patent and Trademark Office*